Sept. 11, 1956     A. A. LINSCHEID     2,762,183
WINDROW HARVESTER
Filed Feb. 25, 1953     6 Sheets-Sheet 1
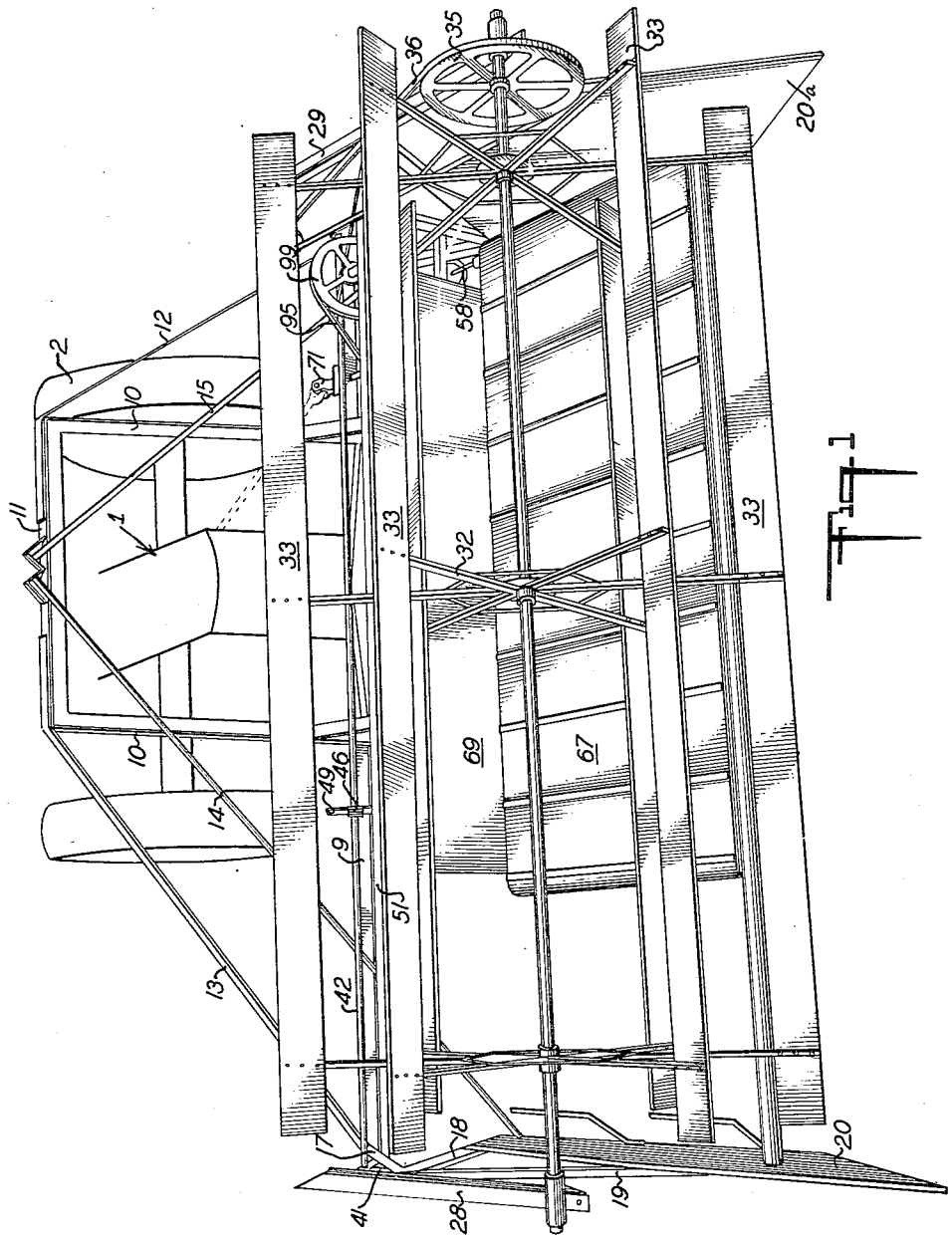
INVENTOR
ARTHUR A. LINSCHEID
BY *Linton and Linton*
ATTORNEYS

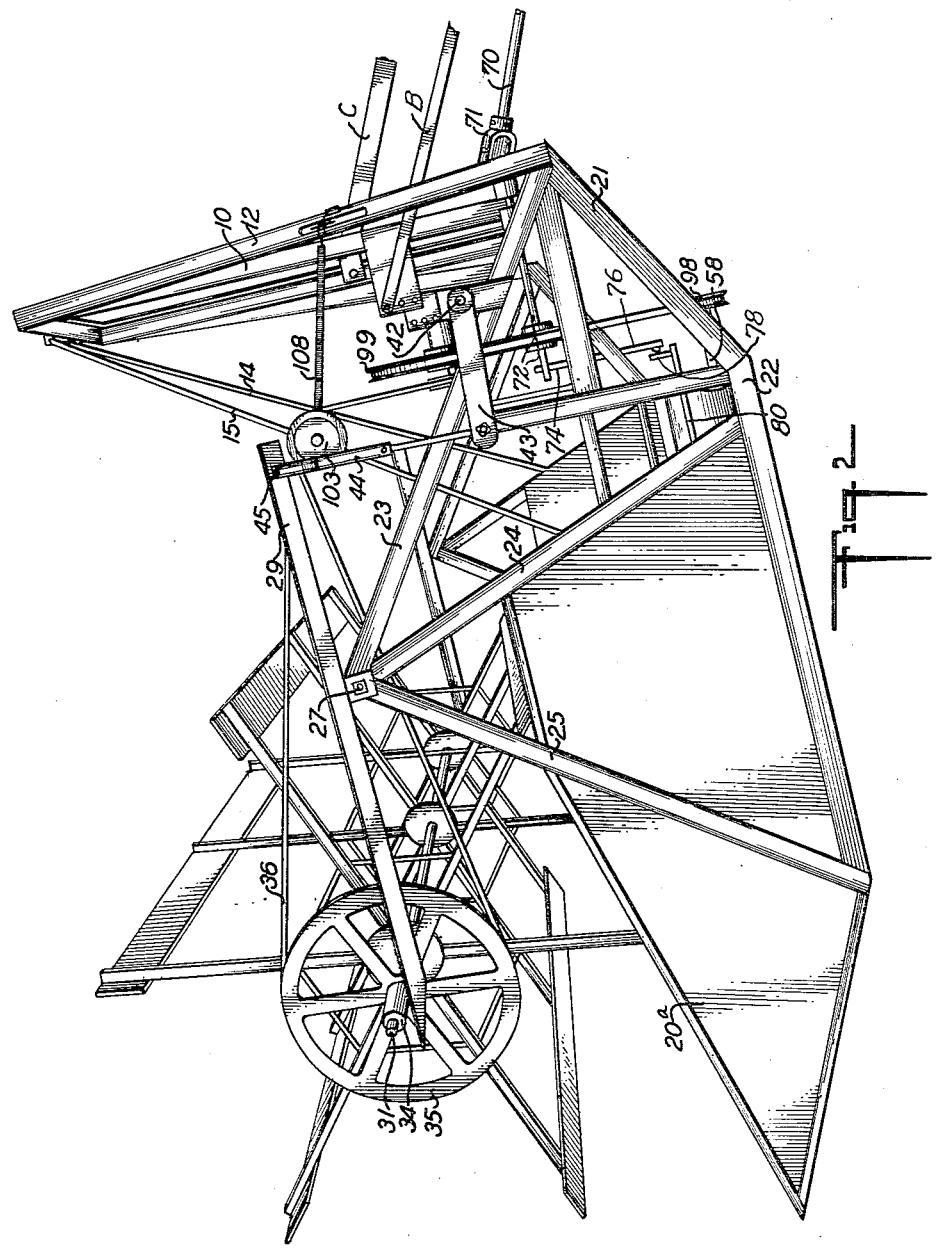

Sept. 11, 1956     A. A. LINSCHEID     2,762,183
WINDROW HARVESTER
Filed Feb. 25, 1953     6 Sheets-Sheet 3
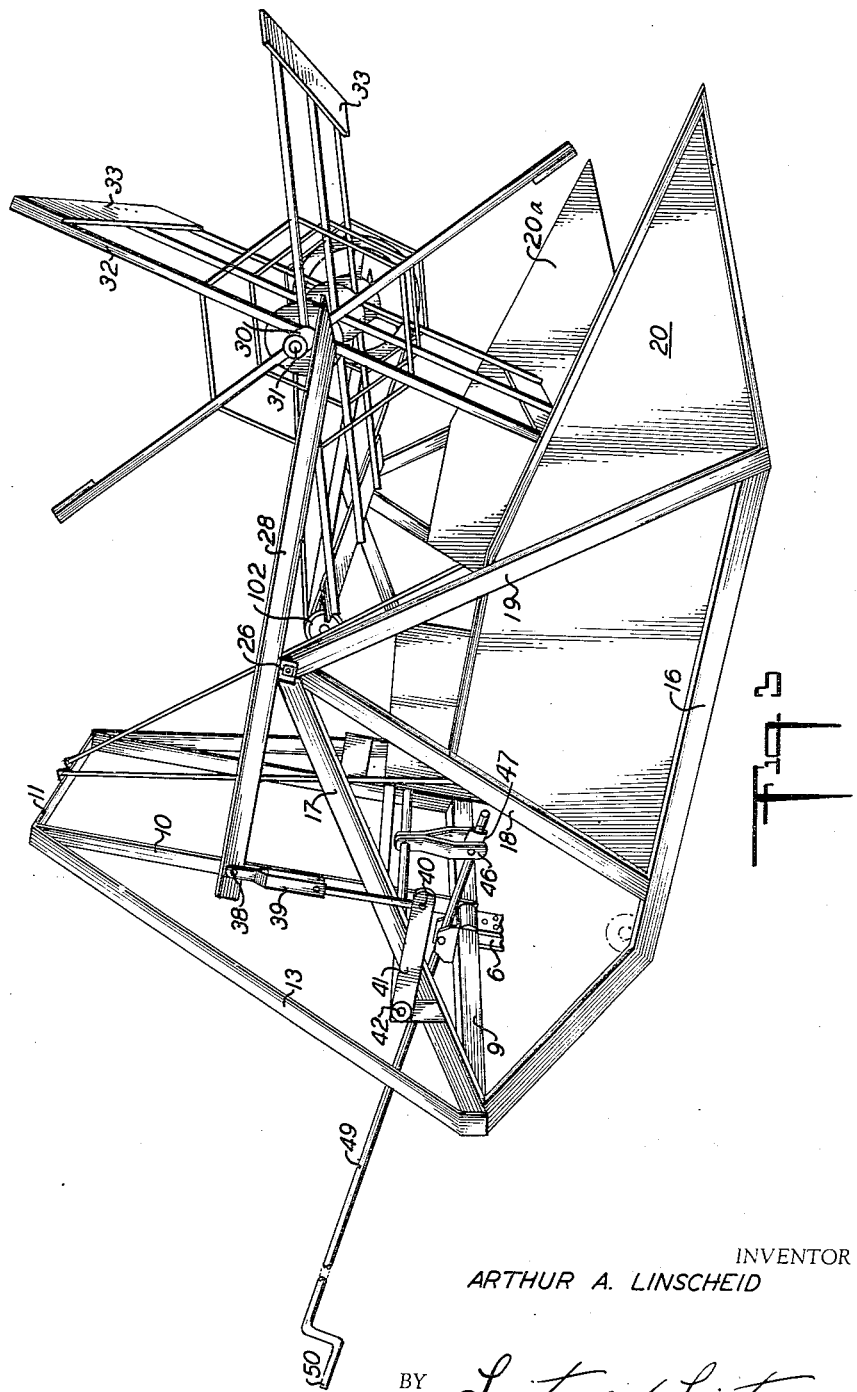
INVENTOR
ARTHUR A. LINSCHEID
BY *Linton and Linton*
ATTORNEYS

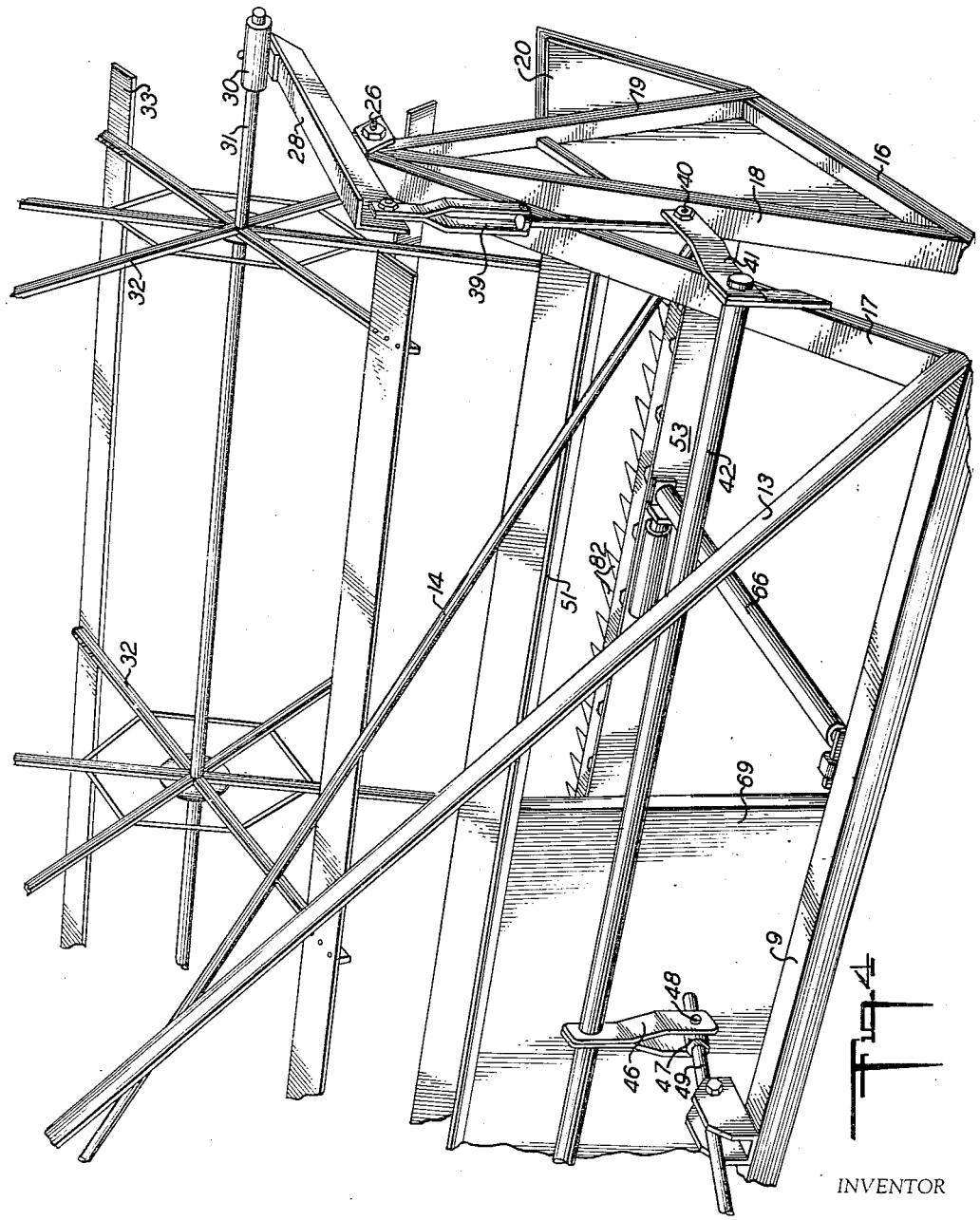

Sept. 11, 1956     A. A. LINSCHEID     2,762,183
WINDROW HARVESTER
Filed Feb. 25, 1953     6 Sheets-Sheet 5
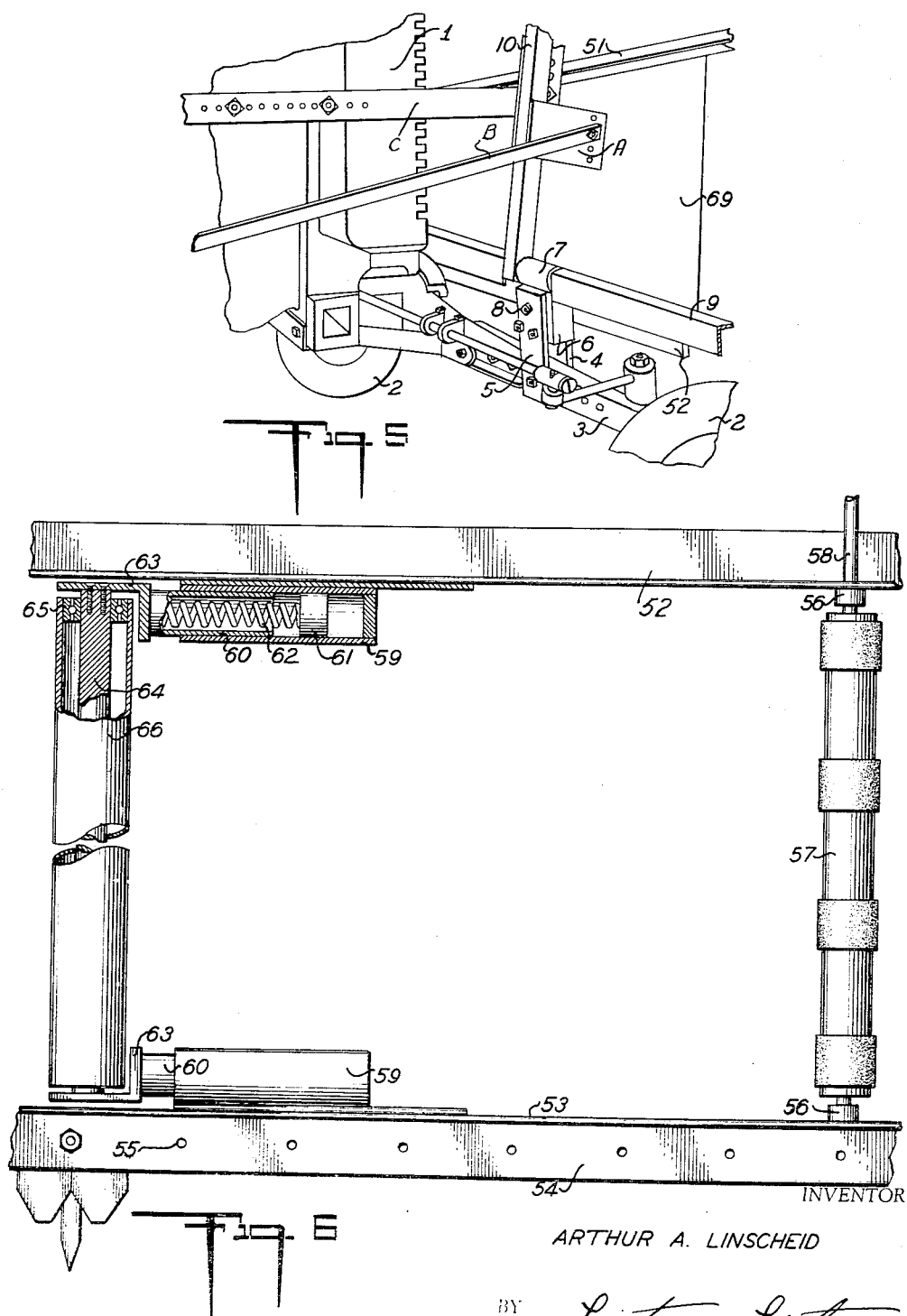
INVENTOR
ARTHUR A. LINSCHEID
BY *Linton and Linton*
ATTORNEYS

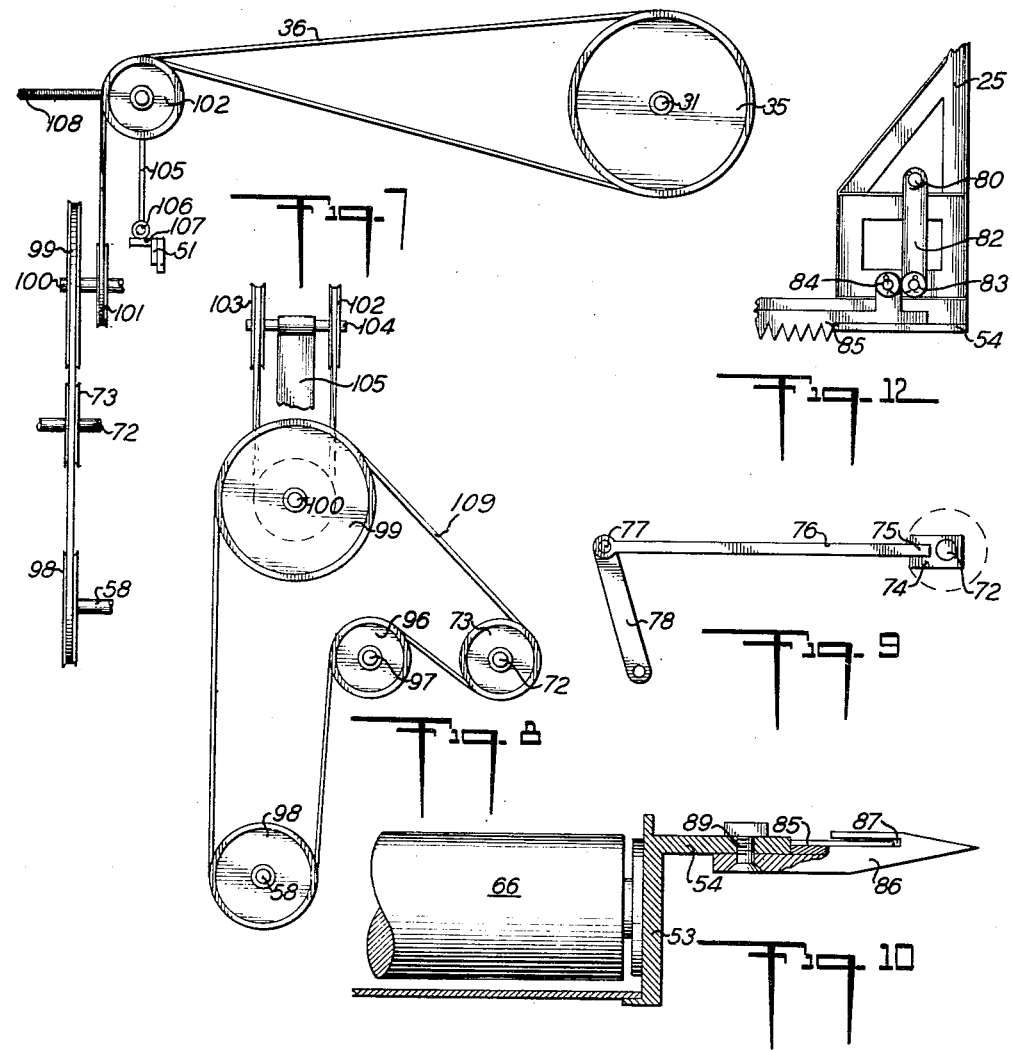

United States Patent Office 2,762,183
Patented Sept. 11, 1956

2,762,183
WINDROW HARVESTER

Arthur A. Linscheid, Boise, Idaho, assignor to A. A. Bennett & F. J. Orr, copartners doing business under the style and firm name of B & L Manufacturing Company, Boise, Idaho Application February 25, 1953, Serial No. 338,730

3 Claims. (Cl. 56—23)

The present invention is concerned with agricultural machinery, particularly a universal harvester to be attached to, supported, and operated by a conventional farm tractor.

The principal object of the present invention is to provide a universal harvester which can be easily and readily pivotally attached to the front end of a standard farm tractor and driven through connection to said tractor for cutting straw or grain and placing the same in untangled windrows of a form adapted to be picked-up by a loader in the general manner.

A further and equally important object of the invention is to provide a universal harvester for being conveyed from the front end of said tractor which has a frame that is sturdy, but sufficiently light in weight so as not to unbalance the tractor and which frame provides for the support of a cutter bar, windrow mechanism and reel with said reel being adjustably mounted for being spaced from the cutter bar and conveyor as desired.

A still further object of the invention is to provide a universal harvester which can be quickly and adjustably mounted on and entirely supported by the front axle of a standard farm tractor and connected to said tractor whereby the operator thereof will have full control of the operation and adjustment of the harvester and the moving elements thereof.

Another object of the invention is to provide a novel drive for the moving elements of the harvester which can be readily connected to the power take-off mechanism of a tractor and which drive allows for adjustment between the position of said moving elements such as the reel, cutting bar and the windrow conveyor as well as their supporting elements.

It is also an object of the invention to provide improved means for interchanging cutter bars and adjustably positioning the same as required in preparation for harvesting due to variations in cutting conditions.

Further objects of the invention will be in part obvious and in part pointed out in the following detailed description of the accompanying drawings wherein, Fig. 1 is a front perspective view of the present harvester mounted upon a farm tractor.

Fig. 2 is a side elevation of the harvester taken from the right-hand side of Fig. 1.

Fig. 3 is a side perspective view of the harvester taken from the left-hand side of Fig. 1.

Fig. 4 is an enlarged rear perspective view of the left hand portion of the harvester showing in detail the reel adjusting mechanism.

Fig. 5 is a rear perspective view showing the pivotal mounting of the harvester upon a tractor axle.

Fig. 6 is an enlarged top view, partly in section and partly broken away, of the windrow conveyor belt supports showing in detail the tensioning device therefor and the cutter bar support.

Fig. 7 is a side plan view of the belt drive for the harvester.

Fig. 8 is a back plan view of Fig. 7.

Fig. 9 is a back plan view of the cutter bar drive.

Fig. 10 is an enlarged detailed cross-sectional view of the cutter bar.

Fig. 11 is an enlarged detailed cross-sectional view of the cutter bar positioned for mowing; and Fig. 12 is a front elevation of the cutter bar drive arm and support.

Referring now more in detail to the accompanying drawings wherein like and corresponding parts are designated by similar reference characters, numeral 1 refers to a conventional farm tractor and in Fig. 5 of the drawings there is shown the front wheels 2 of a tractor with their connecting front axle 3. The present harvester is mounted upon this tractor axle 3 by means of two pairs of plates 4 and 5, only one pair of said plates being shown in the drawing with each pair thereof connected to an opposite side of the axle by bolts passed through preformed openings in the axle. Between these plates is a block 6 having a bearing 7 mounted on the top thereof with the blocks fastened between their respective plates 4 and 5 by nuts and bolts 8. An angle iron 9 forming the bottom support for the harvester has a stub axle (not shown) extending through bearing 7 allowing the oscillation of the bar 9. A pair of uprights 10 each extend from bar 9 adjacent one of the bearings 7 and has a forwardly projecting plate A to which is pivotally connected a counter balancing arm B. Upright 10 also has a controlling arm C pivotally connected thereto which arm C is also connected to the tractor for being reciprocated and thereby pivoting the harvester. The foregoing features of the present construction are shown and described more in detail in my co-pending application Serial No. 194,531, filed November 7, 1950, now Patent No. 2,716,319.

The present harvester, in addition to the aforementioned angle iron 9 and uprights 10, has a cross bar 11 connecting the tops of said uprights. From this cross bar 11 there extends in opposite directions a pair of supporting arms 12 and 13 which are connected to the opposite ends of bar 9. Said uprights 10, cross bar 11 and arms 12 and 13 provide a rear upright frame for the harvester. From the center of cross bar 11 forwardly and to each side extends connecting arms 14 and 15, with arm 14 connected at its lower end to a bottom bar 16. Said bar 16 is connected at one end to an end of angle iron 9 and extends downwardly where it is bent and extends forwardly. Three uprights 17, 18 and 19 are mounted on said bar 16 with one end of upright 17 joining bar 9, support 13 and bar 16. Upright 18 is mounted on one end of the straight portion of bar 16, while upright 19 is connected to the front end of bar 16. A wind shield 20 extends across uprights 18 and 19 and forwardly thereof for preventing the cut crops from being disturbed by the wind. The opposite end of bar 9, that is the right hand end thereof when facing the harvester from the front, has a forwardly extending bar 21 connected thereto and extending downwardly where it is bent and extends horizontally as at 22 forming a bottom supporting bar. The same end of bar 9 has an upwardly extending upright 23 which is connected at its opposite end to a pair of uprights 24 and 25 whose bottom ends are spaced apart and mounted on base bar 22. Uprights 23, 24 and 25 are connected together by a bolt 27 which also pivotally supports the reel control arm 29. A wind shield 20a also extends across uprights 24 and 25 and forwardly thereof. Said bar 16, uprights 17, 18 and 19 provide a side frame for the harvester, while bars 21 and 22 and uprights 23, 24 and 25 provide a second side frame substantially parallel to the first mentioned frame.

Uprights 17, 18 and 19 are similarly joined together by a bolt 26 which also pivotally supports a second reel control arm 28 at a medial portion thereof. Arm 28 has a bearing 30 mounted on the forward end thereof through which extends one end of a shaft 31 supporting the reel consisting of a plurality of radially extending arms 32 with boards 33 connecting the ends of arms 32 in the same plane. The opposite end of axle 31 extends through a bearing 34 supported by the forward end of the second control arm 29. A pulley wheel 35 is fixedly mounted upon axle 31 adjacent bearing 34 and has an endless belt 36 passing therearound which drives the same.

The rear end of control arm 28 has a strap 39 pivotally connected at one end by bolt 38 thereto with its opposite end pivotally connected by bolt 40 to an end of connecting arm 41. Said arm 41 is fixedly connected at its opposite end to shaft 42.

The second control arm 29 has an arm 44 pivotally connected at 45 at the rear end thereof and which arm 44 is also pivotally connected at its opposite end to an end of crank arm 43 which in turn is fixedly connected at its opposite end to shaft 42. The medial portion of shaft 42 has a Y-shaped strap 46 fixedly connected at one end thereto and extending downwardly therefrom. An internally threaded cylinder 47 has a pair of stub axles 48 extending from opposite sides thereof to and through strap 46 for pivotally connecting the same thereto. A threaded rod 49 extends through cylinder 47 and is in threaded engagement therewith. Rod 49 is rotatably supported on the side of the tractor with handle 50 positioned adjacent the operator whereby he may rotate the same as desired.

As shown in Figs. 1 and 4 of the drawings a supporting bar 51 extends between and is connected to the uprights 17 and 23. Below this bar 51 there extends an angle iron 52 which is connected at one end to the base bar 22 at its rear end portion and is connected to bar 51 by shield 69 for being supported thereby. A second angle iron 53 is connected to and extends between the front end portions of the base bars 16 and 22, thus being level with bar 52 and also parallel with but below angle iron 9. Angle iron 53 thus then extends across the front of the harvester and has a forwardly projecting flat side thereof 54 at the very front of the harvester. This flat portion 54 has a series of openings 55 formed therealong for the attachment of the cutter bar, as will hereinafter be described. The upright portions of both angle bars 52 and 53 have a bearing 56 mounted upon their right hand end portion and roller 57 is rotatable mounted in these bearings with the driving end 58 thereof extending through the upright of angle bar 52.

At their opposite ends angle bars 52 and 53 each have a cylinder 59 mounted upon their upright face and pistons 60 are slidably mounted in these cylinders. The cylinders further have pistons 61 slidably mounted therein with a coil spring 62 extending within the bore of each piston 60 which springs together with the air compressed behind pistons 61 tends to move said pistons 60 from said cylinders. Pistons 60 have angle arms 63 mounted upon their outer end with axle 64 fixedly mounted therebetween. Roller bearings 65 are mounted upon each end of axle 64 with roller 66 supported by these bearings 65 for free rotation. An endless belt or conveyor 67 is mounted around rollers 57 and 66 with roller 57 for driving the same and roller 66 for maintaining the same taut.

A back shield 69 extends between the angle bars 51 and 52 behind the conveyor belt 67. Both shield 69 and belt 67 extend from the right hand portion of the harvester about three-fourths of the way across, leaving an opening between the ends of the conveyor 67 and the left hand wind guard 20 whereby the cut material can fall to the ground in a windrow therebetween. A shaft 70 is rotatably connected to the power take-off of the tractor (not shown) for being driven thereby and extends forwardly to a universal joint 71. Said joint 71 is further connected to a drive shaft 72 upon which is fixedly mounted a pulley 73. Beyond said pulley 73 a crank 74 is fixedly mounted upon the end of shaft 72 and has a connecting arm 76 pivotally connected by pivot pin 75 thereto. Connecting arm 76 is also pivotally connected at 77 to a further arm 78. The opposite end of arm 78 is fixedly connected to a drive shaft 80 which extends forwardly of the harvester and has an arm 82 fixedly connected upon the end thereof. This arm 82 which extends vertically is pivotally connected to a bearing 83 connected to a second bearing 84 pivotally connected to cutter bar 85.

A recessed cutter bar support 86 having a series of teeth extending forwardly from the front thereof has said cutter bar 85 slidable therein. The support 86 is attached to the horizontal face of angle bar 53 by means of nuts and bolts 89 extending through openings 55.

When it is desired to lower the position of the cutter bar, an S-shaped bar 90 is attached by nuts and bolts 89 to the horizontal section 54 of angle bar 53. The cutter bar support 86 is then attached to the forward horizontal portion of S bar 90 by means of nuts and bolts 93. Top and bottom shields 94 and 95 are held by nuts and bolts 93 and cover the S bar 90 for guiding the material to the conveyor belt 67.

For driving the harvester an endless belt 109 extends from said pulley 73 around a second pulley 96 rotatably mounted upon a shaft 97 and further around a pulley 98 fixedly mounted upon the shaft 58 for the conveyor belt. Belt 109 then extends around a large pulley 99 fixedly mounted upon a shaft 100 which also has a pulley 101 fixedly mounted thereon. Belt 36 for the reel pulley 35 extends around said pulley 101 and also around a pair of spaced pulleys 102 and 103 which are free and rotatably mounted on shaft 104. These pulleys 102 and 103 which extend in parallel planes to pulley 35 have their shaft 104 pivotally supported by an arm 105 connected to a pivot 106 supported by a bar 107 which in turn is mounted upon the forward face of frame member 51. A coil spring 108 extends from arm 105 to upright 12 for tending to move the pulleys 102 and 103 away from pulley 35 for placing a tension upon the belt 36.

The present harvester can accordingly be attached to any conventional tractor after providing holes along the axle thereof by fastening plates 4 and 5 to the axle and attaching blocks 6 and angle bar 9 thereto. As described in my aforementioned co-pending application, bar B is attached to the rear of the tractor by a coil spring (not shown) for tending to maintain upright 10 in substantially a vertical position. Bar C is connected to a hydraulic mechanism or levers (not shown) as desired for reciprocating the same and thereby oscillating uprights 10 and, accordingly, the entire harvester.

The operator of the tractor can rotate handle 50 of rod 49 which will move threaded cylinder 47 therealong and thus oscillate Y-strap 46 turning shaft 42 and through the connecting arms pivot supporting arms 28 and 29 for raising and lowering the reel. Thus the operation of bar C raises and lowers the cutter bar 85 relative to the ground and operation of crank 50 further raises and lowers said reel relative to the cutter bar and also the ground independently of the adjustment of the entire harvester.

Drive shaft 70 which is driven from the power takeoff of the tractor rotates shaft 72, and accordingly, through crank 74 reciprocates arm 76 which, through link 78, turns shaft 80 and accordingly link 82 which reciprocates the cutter bar 85.

Also shaft 72 rotates pulley 73 which through belt 109 travelling around pulley 98 rotates shaft 58 and thereby the conveyor belt roller 57 for driving the conveyor belt. Belt 109 also turns pulley 99, shaft 100 and accordingly, pulley 101 affixed thereto. Thus belt 36 is caused to travel around pulley 35 rotating the reel.

Coil spring 108 pulling the pivotally mounted pulley 102 and 103 places a tension on belt 36 for keeping the same sufficiently taut regardless of the raising and lowering of the cutting reel by means of the crank 50.

Thus as the tractor 1 is caused to progress over a field to be moved, the operator can start the power take-off of the tractor causing the reel 33 to rotate, cutter bar 85 to reciprocate and endless belt 67 to move whereby the grain or other crop is cut and deposited in a windrow to one side of the tractor to be picked up by a conventional loader. The relative positions of the cutter bar and reel are completely under the control of the operator who may quickly and easily make adjustments from his operating seat to meet varying cutting conditions.

It is to be appreciated that the present harvester can be readily and easily mounted upon various tractors, even of different types when so desired.

The present invention is capable of considerable modification and such changes thereto as come within the scope of the appended claims is deemed to be a part of the invention.

I claim:

1. A windrow harvester for being adjustably mounted on the front axle of a farm tractor having a power take-off means comprising an elongated bar, means rotatably supporting said bar and capable of being detachably mounted on said tractor front axle with said bar extending laterally of the front of said tractor, a rear upright frame of interconnected uprights mounted on said bar for extending above said axle, a pair of side frames each composed of interconnected uprights and a bottom supporting bar with each side frame connected to an end of said elongated bar and extending substantially parallel to one another and perpendicular from said elongated bar, a pair of control arms each pivotally mounted on the uprights of one of said side frames, a reel rotatably supported on and between end portions of said arms, a cutter bar operatively mounted between and connected to said side frames below said reel, a conveyor belt rotatably mounted between and connected to said side frames behind said cutter bar, means connecting said side frames to said rear upright frame for receiving support therefrom, means extending longitudinally of said tractor and operatible by the driver thereof for rotating said bar and adjusting the position of the harvested thereby and means carried by said harvester for operatively connecting said reel, cutter and belt to said tractor power take-off means, a pair of straps each pivotally connected at one end to the end of one of said arms opposite to said reel, a pair of connecting arms pivotally connected at one end to the other end of one of said straps, a shaft rotatably mounted on and extending between said side frames with one of said connecting arms fixedly connected to each end thereof, a strap fixedly connected at one end to said shaft, an internally threaded cylinder pivotally connected to the opposite end of said fixed strap and an operating crank having a threaded end portion extending through said cylinder in threaded engagement therewith for adjusting the position of said reel and capable of extending most of the length of said tractor for being operated by the driver thereof.

2. A windrow harvester for being adjustably mounted on the front axle of a farm tractor having a power take-off means comprising an elongated bar, means rotatably supporting said bar and capable of being detachably mounted on said tractor front axle with said bar extending laterally of the front of said tractor, a rear upright frame of interconnected uprights mounted on said bar for extending above said axle, a pair of side frames each composed of interconnected uprights and a bottom supporting bar with each side frame connected to an end of said elongated bar and extending substantially parallel to one another and perpendicular from said elongated bar, a pair of control arms each pivotally mounted on the uprights of one of said side frames, means capable of extending longitudinally of said tractor for being manually operated and pivoting said arms as required, a reel rotatably supported on and between end portions of said arms, a cutter bar operatively mounted between and connected to said side frames below said reel, a conveyor belt rotatably mounted between and connected to said side frames behind said cutter bar, means connecting said side frames to said rear upright frame for receiving support therefrom, means extending longitudinally of said tractor and operable by the driver thereof for rotating said bar and adjusting the position of the harvester thereby, a pulley fixedly connected to said reel for rotating therewith, a shaft for extending longitudinally of said tractor and capable of being connected to said tractor power take-off, a second pulley rotatably supported on said harvester and positioned extending substantially at right angles to said reel pulley, means operatively connecting said shaft to said second pulley for rotating the same together, an arm pivotally connected at one end to said harvester, a pair of pulleys extending substantially parallel to said reel pulley, above said second pulley and being rotatably mounted on the opposite end of said arm, resilient means tending to move said arm with its pair of pulleys away from said reel pulley, an endless belt passing around said reel pulley, said second pulley, and over the top periphery of said pair of pulleys for rotating the same together and means operatively connected to said shaft for operating said cutter and said belt.

3. A windrow harvester for being adjustably mounted on the front axle of a farm tractor having a power take-off means comprising an elongated bar, means rotatably supporting said bar and capable of being detachably mounted on said tractor front axle with said bar extending laterally of the front of said tractor, a rear upright frame of interconnected uprights mounted on said bar for extending above said axle, a pair of side frames each composed of interconnected uprights and a bottom supporting bar with each side frame connected to an end of said elongated bar and extending substantially parallel to one another and perpendicular from said elongated bar, a pair of control arms each pivotally mounted on the uprights of one of said side frames, means capable of extending longitudinally of said tractor for being manually operated and pivoting said arms as required, a reel rotatably supported on and between end portions of said arms, a cutter bar operatively mounted between and connected to said side frames below said reel, a conveyor belt rotatably mounted between and connected to said side frames behind said cutter bar, means connecting said side frames to said rear upright frame for receiving support therefrom, means extending longitudinally of said tractor and operable by the driver thereof for rotating said bar and adjusting the position of the harvester thereby, a shaft extending laterally of said elongated bar and capable of being connected to said tractor power take-off for being rotated thereby, a pulley fixedly connected to said shaft, means for operatively connecting said fixed pulley to said belt and said reel for rotation together, a drive shaft rotatably supported by and extending lengthwise of one of said side frames, a pair of arms each fixedly mounted on an end of said drive shaft with one of said arms being pivotally connected to said cutter bar for operating the same, a crank fixedly connected to said first mentioned shaft, a connecting arm pivotally connected at one end to said crank and at its opposite end to the end of the other arm of said pair of arms opposite to said drive shaft whereby rotation of said first mentioned shaft reciprocates said cutter bar.

References Cited in the file of this patent

UNITED STATES PATENTS

| 885,157 | Hovland | Apr. 21, 1908 |
| 2,259,750 | Johnson | Oct. 21, 1941 |
| 2,438,068 | Mercier | Mar. 16, 1948 |
| 2,455,122 | Hansen | Nov. 30, 1948 |
| 2,463,273 | Holstein | Mar. 1, 1949 |
| 2,528,659 | Krause | Nov. 7, 1950 |
| 2,593,617 | Schroeppel | Apr. 22, 1952 |
| 2,631,421 | Pierce | Mar. 17, 1953 |
| 2,638,728 | Balzer et al. | May 19, 1953 |
| 2,681,537 | Heth et al. | June 22, 1954 |
| 2,689,442 | Heth | Sept. 21, 1954 |

FOREIGN PATENTS

| 868,685 | France | Oct. 13, 1941 |